(12) United States Patent
Sankhala et al.

(10) Patent No.: US 11,185,828 B2
(45) Date of Patent: Nov. 30, 2021

(54) METHOD FOR PREPARING ISOPOROUS HOLLOW FIBER COMPOSITE MEMBRANES

(71) Applicant: Helmholtz-Zentrum hereon GmbH, Geesthacht (DE)

(72) Inventors: Kirti Sankhala, Geesthacht (DE); Volker Abetz, Lüneburg (DE); Joachim Koll, Schwarzenbek (DE)

(73) Assignee: Helmholtz-Zentrum hereon GmbH, Geesthacht (DE)

( * ) Notice: Subject to any disclaimer, the term of this patent is extended or adjusted under 35 U.S.C. 154(b) by 136 days.

(21) Appl. No.: 16/609,830

(22) PCT Filed: Jun. 18, 2018

(86) PCT No.: PCT/EP2018/066130
§ 371 (c)(1),
(2) Date: Oct. 31, 2019

(87) PCT Pub. No.: WO2019/020278
PCT Pub. Date: Jan. 31, 2019

(65) Prior Publication Data
US 2020/0070101 A1 Mar. 5, 2020

(30) Foreign Application Priority Data

Jul. 27, 2017 (EP) ..................... 17183511

(51) Int. Cl.
*B01D 69/12* (2006.01)
*B01D 69/08* (2006.01)
*B01D 69/10* (2006.01)
*B01D 71/28* (2006.01)

(52) U.S. Cl.
CPC .......... *B01D 69/12* (2013.01); *B01D 69/081* (2013.01); *B01D 69/10* (2013.01); *B01D 71/28* (2013.01);
(Continued)

(58) Field of Classification Search
CPC ........ B01D 69/02; B01D 69/12; B01D 71/28; B01D 71/80; B01D 69/08; B01D 2325/04;
(Continued)

(56) References Cited

U.S. PATENT DOCUMENTS 5,039,418 A   8/1991  Schucker
6,156,381 A * 12/2000 Leong ................ B01D 67/0093
                                                    427/230
(Continued)

FOREIGN PATENT DOCUMENTS

CA   2886437 A1   5/2014
EP   2977101 A1   1/2016
EP   3147024 A1   3/2017

OTHER PUBLICATIONS

Structure Formation of Integral Asymmetric Composite Membranes of Polystyrene-block-Poly (2-vinylpyridine) on a Nonwoven; Adina, Jung et al., Macromolecular Materials and Engineering, 2012, 297, pp. 790-798.*
(Continued)

*Primary Examiner* — Ana M Fortuna
(74) *Attorney, Agent, or Firm* — Marshall, Gerstein & Borun LLP

(57) ABSTRACT

The present invention provides a coated hollow fiber membrane which has an isoporous inner skin and a porous outer support membrane, i.e. an inside-out isoporous composite hollow fiber membrane, and to a method of preparing such membranes. The coated hollow fiber membrane is prepared by a method comprising providing a hollow fiber support membrane having a lumen surrounded by the support membrane, and coating and the inner surface thereof by first passing a polymer solution of at least one amphiphilic block copolymer in a suitable solvent through the lumen of the hollow fiber support membrane and along the inner surface (Continued)

thereof, thereafter pressing a core gas stream through the lumen of the coated hollow fiber mebrane, and thereafter passing a non-solvent (precipitant) through the lumen of the coated hollow fiber membrane. In order to remove the solvent or solvents completely, the membranes are kept in water for 1-2 days and washed prior to use. In order to maintain the porosity of support membrane, membrane pretreatment is advantageous prior to coating which reduces the infiltration of block copolymer solution. The membranes are useful infiltration modules, in particular microfiltration modules, ultrafiltration modules, nano-filtration modules.

15 Claims, 6 Drawing Sheets

(52) U.S. Cl.
CPC ...... *B01D 2323/02* (2013.01); *B01D 2323/42* (2013.01); *B01D 2325/26* (2013.01)

(58) Field of Classification Search
CPC .............. B01D 53/228; B01D 2325/36; B01D 67/0009
See application file for complete search history.

(56) References Cited

U.S. PATENT DOCUMENTS

| | | | | |
|---|---|---|---|---|
| 2009/0173694 A1* | 7/2009 | Peinemann | ............ | B01D 71/80 210/650 |
| 2011/0094960 A1* | 4/2011 | Zhou | ................... | B01D 69/125 210/500.27 |
| 2015/0217237 A1* | 8/2015 | Abetz | ................... | B01D 71/82 210/500.22 |
| 2019/0299166 A1* | 10/2019 | Noor | .................. | B01D 67/0013 |
| 2021/0197129 A1* | 7/2021 | Rangou | ................ | B01D 69/087 |

OTHER PUBLICATIONS

European Application No. 17183511.9, Extended European Search Report, dated Dec. 15, 2017.
International Application No. PCT/EP2018/066130, International Preliminary Reporton Patentability, dated Sep. 10, 2019.
International Application No. PCT/EP2018/066130, International Search Report and Written Opinion, dated Sep. 25, 2018.
Liu et al., Fabrication of a novel PS4VP/PVDF dual-layer hollow fiber ultrafiltration membrane, J. Membrane Sci., 506, 1-10, 2016.
Saleem et al., Block copolymer membranes from polystyrene-b-poly(solketal methacrylate) (PS-b-PSMA) and amphiphilic polystyrene-b-poly(glyceryl methacrylate) (PS-b-PGMA), Polymers, 9(6):216 (2017).
Zhang et al., Block Polymer Membranes Functionalized with Nanoconfined Polyelectrolyte Brushes Achieve Sub-Nanometer Selectivity, ACS Macro Lett., 6:726-32 (2017).
Zhang et al., Nanomanufacturing of High-performance Hollow Fiber Nanofiltration Membranes by Coating Uniform Block Polymer Films from Solution, J. Mater. Chern. A, 5:3358 (2017).

* cited by examiner

METHOD FOR PREPARING ISOPOROUS HOLLOW FIBER COMPOSITE MEMBRANES

The present invention relates to coated hollow fiber membranes which have an isoporous inner skin and a porous outer support membrane, i.e. an inside-out isoporous composite hollow fiber membrane, and to a method of preparing such membranes.

The invention further relates to the use of the coated hollow fiber membrane according to the present invention for filtration, such as in particular for microfiltration, ultrafiltration, nanofiltration and/or reverse osmosis, in particular for ultrafiltration.

BACKGROUND OF THE INVENTION

Membrane separation is widely used in the food technology, biotechnology and pharmaceutical industries for mechanical separation of fluid, e.g. gaseous or liquid streams.

Membrane separation technology using a separation membrane having a hollow fiber structure has been applied to water purification and sewage and wastewater processes. In accordance with the material used for its production, membranes useful in particular for water treatment can be classified into the following categories: polymer membranes, ceramic membranes, and metal membranes. Such membranes are used for microfiltration (MF), ultrafiltration (UF), nanofiltration (NF), and reverse osmosis (RO). Ultrafiltration membranes allow small molecules and ions to be permeated, but remove high molecular polymer particles or bacteria and viruses, and may vary according to the requirements of use. They usually have a pore size in a range of from 0.01 to 0.1 µm. Ultrafiltration membranes having such characteristics have a wide application range, but are particularly interesting for pretreatment of process water or ultrapure water, reuse, sewage and wastewater treatment and water purification. Also in wastewater treatment, membrane technology is becoming increasingly important. With the help of ultrafiltration or microfiltration it is possible to remove particles, colloids and macromolecules, so that wastewater can be disinfected in this way.

Such membranes have a porous separation layer on top wherein the size and size distribution (regularity) of the pores determine filtration selectivity.

Published Canadian Patent Application 2,886,437 A1 discloses a method for producing a hollow fiber polymer membrane having an isoporous outer skin, a porous inner skin and a sponge-like inner structure. The method described in CA 2,886,437 A1 comprises providing a polymer solution of at least one amphiphilic block copolymer in an appropriate solvent, extruding the polymer solution through an annular die in a spinneret while simultaneously extruding an aqueous core liquid from an orifice encircled by the annular die into air and subsequently into a precipitation bath to precipitate the spinning solution to form the hollow fiber. The method described in CA 2,886,437 A1 produces excellent hollow fiber polymer membrane having an isoporous outer skin.

During separation, the fluid stream is passed along the outside of the hollow fiber polymer membrane, and the permeate stream is collected from the inside of the hollow fiber polymer membrane. This outside-in separation is undesirable for a number of reasons, including the difficulty to control concentration polarization and membrane fouling. Therefore, in many cases an opposite filtration direction is desirable. This is because of protection of selective surface, better distribution of feed on the lumen side during filtration, and ease of processing and maintenance. For example, cleaning of membranes with isoporous inner skin by backwashing or forward aeration will be easier, and the overall fouling and clogging by bacteria and other foulants may thereby be reduced in comparison to hollow fiber polymer membranes having an isoporous outer skin.

European patent application 3,147,024 A1 discloses a hollow fiber polymer membrane having a novel structure with an isoporous inner skin and a porous outer skin as well as a novel method for its production. The method described in EP 3,147,024 A1 comprises providing a polymer solution of at least one amphiphilic block copolymer in a solvent or solvent mixture, extruding the polymer solution through a first annular die in a spinneret while simultaneously passing a core gas stream through at least one orifice encircled by the first die and extruding that sheath liquid comprising at least one precipitant from a second die encircling the first annular die into air, and subsequently into an aqueous precipitation bath. The spinning solution is precipitated in the precipitation bath to form the hollow fiber polymer membrane having an isoporous inner skin and a porous outer skin.

During the separation, the fluid stream is passed along the inside of the hollow fiber polymer membrane, and the permeate stream is removed from the outside of the fiber, which is less complex.

According to both, CA 2,886,437 and EP 3,147,024 A1 self-assembly of the block copolymers and non-solvent induced phase separation (SNIPS) form the isoporous skin on the site opposite to where the non-solvent is contacted with the polymer solution. In both, CA 2,886,437 and EP 3,147,024 A1, the hollow fiber membrane is formed entirely by the block-copolymer. However, in the spinning process highly concentrated block copolymer solution is required, and the production of isoporous hollow fibers by the spinning process CA 2,886,437 and EP 3,147,024 A1 is comparatively expensive. The spinning of block copolymer solution results in membrane substructures having a comparatively low number of through-pores due to the high entanglement of polymer chains during extrusion. This less porous substructure decreases water permeability. Further, the spinning process often does not provide the required mechanical strength of the membranes. It would therefore be desirable to provide hollow fiber membranes with isoporous inner skin and a porous outer skin which have high mechanical strength, such as flexibility, and which have a lower content of expensive block copolymers.

While coating is a demonstrated strategy to reduce the block copolymer consumption in flat sheet membranes, forming an isoporous surface layer on the inner surface of hollow fibers proved to be a challenge. Dip coating or spray coating can typically only be applied to flat sheet membranes or the outer surface of a hollow fiber membrane, in particular due to the complex mechanism of isoporous structure formation.

SUMMARY OF INVENTION

It is therefore an object of the present invention to provide such hollow fiber composite membranes having an isoporous inner skin, which have high mechanical strength, such as improved flexibility, and which have a lower content of block copolymers, as well as a method for the production thereof.

The above objects are solved by a method for producing a coated hollow fiber membrane having an isoporous inner skin, comprising providing a hollow fiber support membrane having a lumen surrounded by the support membrane, and coating the inner surface thereof by first passing a polymer solution of at least one amphiphilic block copolymer in a suitable solvent through the lumen of the hollow fiber support membrane and along the inner surface thereof, thereafter pressing a core gas stream through the lumen of the coated hollow fiber membrane, and thereafter passing a non-solvent (precipitant) through the lumen of the coated hollow fiber membrane.

The membranes according to the present invention are self-supporting and have an isoporous inner skin, a porous outer skin, and a sponge-like inner structure. The inner skin is typically of a different material than the outer skin of the coated hollow fiber membrane.

DETAILED DESCRIPTION OF PREFERRED EMBODIMENTS

Hollow fiber support membrane having a lumen to be coated with an isoporous inner skin of a block copolymer is preferably a polymeric membrane such as a cellulose acetate (CA) membrane, a polyethersulfone (PES) membrane, a polyetherimide (PEI) membrane, a polyvinylidene fluoride (PVDF) membrane, a polysulfone (PSf) membrane, a polyacrylonitrile (PAN) membrane, a polyamide-imide (PAI) membrane, a modified cellulose acetate (mCA) membrane, a modified polyethersulfone (mPES) membrane, a modified polyetherimide (mPEI) membrane, a modified polyvinylidene fluoride (mPVDF) membrane, a modified polysulfone (mPSf) membrane, a modified polyacrylonitrile (mPAN) membrane, a modified polyamide-imide (mPAI) membrane, etc. Alternatively, the hollow fiber support membrane having a lumen may be a ceramic or a metallic membrane.

The hollow fiber support membrane may preferably have a diameter ranging from 0.2 to 3.0 mm, preferably from 0.5 to 1.5 mm, and the lumen of the hollow fiber support membrane may preferably have a diameter of from 0.1 to 2.5 mm, preferably from 0.3 to 1.49 mm. The length of the hollow fiber support membrane may be from few centimeters to few meters. Preferably, however, the hollow fiber support membrane has a length of from 5 to 50 cm, more preferably from 10 to 25 cm. Preferably the hollow fiber support membrane has a median pore size of from 20 nm to 20 µm, more preferably from 50 nm to 1 µm, as determined by electron microscopy. The pore size of the hollow fiber support membrane is, however, not critical for many applications.

The at least one amphiphilic block copolymer used for making the isoporous inner skin of the coated hollow fiber membrane may be the same as used in EP 3,147,024 A1, which is fully incorporated by reference herewith. Further amphiphilic block copolymers useful for making the isoporous inner skin of the coated hollow fiber membrane are those disclosed in S. Saleem et al., "*Block Copolymer Membranes from Polystyrene-b-poly(solketal methacrylate) (PS-b-PSMA) and Amphiphilic Polystyrene-b-poly(glyceryl methacrylate) (PS-b-PGMA)*", Polymers 2017, 9(6), 216, which is fully incorporated by reference herewith.

Besides of the amphiphilic block as disclosed in EP 3,147,024 A1 and S. Saleem et al., preferred pore forming polymer blocks are selected from poly(N,N-dimethylacrylamide) (PDMA), poly(acrylic acid), poly(glutamic acid) (PGA), poly-γ-glutamic acid (γ-PGA), Polyaspartic acid (polyaminoacid), poly(ethyleneoxide) (PEO), poly[(allyl glycidyl ether)-co-(ethylene oxide)], poly(2-acrylamido-ethane-1,1-disfulonic acid), poly(glyceryl methacrylate) (PGMA), poly(2-ethylhexyl methacrylate)(PEHMA), poly (4-butyltri-phenylamine), poly(triphenylamine), polyphenylalanine, poly(N-isopropylacrylamide) (PNIPAM), poly(N,N-dimethylaminoethyl methacrylate) (PDMAEMA), poly(poly(ethylene glycol)methyl ether methacrylate) (P(PEGMA)).

Further amphiphilic block copolymers useful for making the isoporous inner skin of the coated hollow fiber membrane are selected from diblock copolymers such as polystyrene-b-poly(solketal methacrylate) (PS-b-PSMA), polystyrene-b-poly(glyceryl methacrylate) (PS-b-PGMA), polystyrene-b-poly(2-ethylhexyl methacrylate) (PS-b-PEHMA), poly(glutamic Acid)-b-Polyphenylalanine, polystyrene-b-poly[(allyl glycidyl ether)-co-(ethylene oxide)] (PS-b-P(AGE-co-EO)), polystyrene-b-poly(N-isopropylacrylamide) (PS-PNIPAM), poly(ethylene oxide)-b-poly(N,N-dimethylaminoethyl methacrylate) (PEO-b-PDMAEMA), polystyrene-b-poly(ethylene oxide) (PS-b-PEO), polybutadiene-b-poly(2-vinylpyridine) (PB-b-P2VP), poly (ethylene oxide)-b-poly(N,N-dimethylaminoethyl methacrylate) (PEO-b-PDMAEMA), polybutadiene-b-poly(N,N-dimethylaminoethyl methacrylate) (PB-b-PDMAEMA), polystyrene-b-poly(2-(dimethylamino)ethyl methacrylate), poly(styrene-co-isoprene)-b-poly(N,N-dimethylaminoethyl methacrylate) (P(S-co-I)-b-PDMAEMA), triblock copolymer and triblock terpolymers such as polystyrene-b-poly(2-vinylpyridine)-b-poly(ethylene oxide) (PS-b-P2VP-b-PEO), polyisoprene-b-polystyrene-b-poly(2-vinylpyridine) (PI-b-PS-b-P2VP), polyisoprene-b-polystyrene-b-poly(N,N-dimethylacrylamide) (PI-b-PS-b-PDMA), polystyrene-b-polyisoprene-b-polylactide (PS-b-PI-b-PLA), polyisoprene-b-polystyrene-b-poly(2-acrylamido-ethane-1,1-disfulonic acid) (PI-b-PS-b-PADSA), polyisoprene-b-polystyrene-b-poly(acrylic acid) (PI-b-PS-b-PAA), polystyrene-b-poly(N-isopropylacrylamide)-b-polystyrene (PS-b-PNIPAM-b-PS), poly(poly(ethylene glycol)methyl ether methacrylate)-b-polystyrene-b-poly(poly(ethylene glycol)methyl ether methacrylate) (P(PEGMA))-b-PS-b-P(PEGMA)), poly(N,N-dimethylaminoethyl methacrylate)-b-poly(ethylene oxide)-b-poly(N,N-dimethylaminoethyl methacrylate) (PDMAEMA-b-PEO-b-PDMAEMA), poly(2-(2-guanidinoethoxy)ethyl methacrylate)-b-PEO-b-poly(2-(2-guanidinoethoxy)-ethyl methacrylate) (PGn-b-PEO-b-PGn), polyisoprene-b-polystyrene-b-poly(4-vinylpyridine) (PI-b-PS-b-P4VP), poly (isoprene-b-styrene-b-(4-vinylpyridine)) P(I-b-S-b-4VP), polystyrene-b-polybutadiene-b-poly (tert-butyl methacrylate) (PS-b-PB-b-PTMA), polystyrene-b-poly(4-vinylpyridine)-b-poly(propylene sulfide) (PS-b-P4VP-b-PPS), and also tetrablock terpolymers such as, polystyrene-b-polyisoprene-b-poly-(ethylene oxide)-b-polystyrene (PS-b-PI-b-PEO-b-PS') and polystyrene-b-polyisoprene-b-polylactide-b-polystyrene (PS-b-PI-b-PLA-b-PS'), and the like.

Preferred star triblock terporlymers for making the isoporous inner skin of the coated hollow fiber membrane are polystyrene-b-poly(2-vinylpyridine)$_3$ (PS-b-P2VP)$_3$, polystyrene-b-poly(2-vinylpyridine)-b-polyethyleneoxide)$_3$ (PS-b-P2VP-b-PEO)$_3$, and polystyrene-b-poly(2-vinylpyridine)-b-bis-polyethyleneoxide)$_3$ (PS-b-P2VP-b-(PEO)$_2$)$_3$.

Most preferred polymers for making the isoporous inner skin of the coated hollow fiber membrane are polystyrene-block-poly(4-vinylpyridine) (PS-b-P4VP) block copolymers. Preferably, the styrene comonomer component is present in 75-85 wt. % of the polymer and the 4-vinylpyridine component is present in 15-25 wt. % of the polymer. Most preferably, the polymer has a molecular weight between 50 and 300 kg/mol.

The polymer preferably makes up a percentage by weight between 1 wt. % and 10 wt. %, more preferably between 1 wt. % and 5 wt. %, and most preferably between 1 wt. % and 3 wt. % of the polymer solution such as around 2 wt. % of the polymer solution.

Several solvents are suitable for preparing the polymer solution. Preferred solvents include diethyl ether, N,N-dimethylformamide (DMF), dimethylacetamide, N-methylpyrrolidone, dimethyl-sulfoxide, acetonitrile, dioxane, acetone, tetrahydrofurane (THF), and mixtures thereof. More preferred solvents include a solvent mixture such as dioxane/THF, dioxane/DMF, dioxane/DMF/THF or dioxane/DMF/acetone. Most preferably, the solvent is dioxane or a mixture including dioxane.

Preferably, the polymer solution is pressed or sucked through the lumen of the support membrane with a flow rate between 0.1 mL/min and 5 mL/min, preferably between 0.2 mL/min and 1.0 mL/min.

According to a further preferred embodiment of the present invention, the polymer solution comprises at least one metal salt. Preferably the metal is selected from an element of the second main group of the periodic system of elements, such as Mg, Ca or Sr or from non-toxic transition metals such as Fe. More preferably, the salt is an organic salt of Mg, Ca or Sr, most preferably magnesium acetate. The metals of the second main group of the periodic system are biocompatible making them preferred for coated hollow fiber membranes with biological applications. The supporting effect of the salt in the phase separation can probably be explained in that the metal salt leads to the formation of partially charged polyelectrolytic micelle cores, which positively impact the precipitant-induced phase separation.

According to a still further preferred embodiment, the polymer solution comprises at least one carbohydrate, multifunctional phenol and/or multifunctional organic acid. Preferred carbohydrates include saccharose, D(+)-glucose, D(−)-fructose and/or cyclodextrin, in particular α-cyclodextrin. Carbohydrates as used in the present invention lead to a stabilization of the isoporous separation-active surface during the phase inversion. The supporting effect of the at least one carbohydrate in phase separation can probably be explained in that the carbohydrates form hydrogen bonds with the hydrophilic block of the block copolymers.

The block copolymer solution may also comprise of any non-solvent such as polyethylene glycol (PEG), polyvinylpyrrolidone (PVP) glycerol, γ-butyrolactone (GBL) in order to increase the viscosity of solution and to reduce overall requirement of block copolymer concentration.

The core gas may be selected from any gas which does not react with the polymer of the membrane. Preferably, the core gas is selected from compressed air, nitrogen ($N_2$), a noble gas, such as argon or helium, and/or carbon dioxide ($CO_2$); most preferably the core gas is nitrogen. Preferably, the core gas is pressed or sucked through the lumen of the support membrane with a flow rate between 0.1 mL/min and 5 mL/min depending on the lumen volume of support fiber, preferably between 0.2 mL/min and 1.0 mL/min.

Preferably the non-solvent (precipitant) comprises water, methanol, ethanol or a mixture of two or more thereof in admixture with any one or more of diethyl ether, more preferably in admixture with at least one pore forming material such as polyethylene glycol (PEG), polyvinylpyrrolidone (PVP) or glycerol. Most preferably the precipitation bath comprises or is comprised of a mixture of water and glycerol. Most preferably the non-solvent (precipitant) is water. Preferably, the non-solvent is pressed or sucked through the lumen of the support membrane with a flow rate between 0.1 mL/min and 5 mL/min, preferably between 0.2 mL/min and 1.0 mL/min.

The so-obtained coated hollow fiber membranes are preferably washed using water, prior to use.

The hollow fiber support membrane is preferably also pretreated by passing a non-solvent for support membrane through the lumen thereof, where non-solvent for support membrane preferably shows good miscibility with the block copolymer solution, such as dioxane or dioxane/acetone. This pretreatment is intended to reduce the infiltration of dilute block copolymer solution. While passing the polymer solution for coating on the top most inner skin of support membrane, the infiltration decreases the porosity of support membrane. The inner surface or lumen of the hollow fiber support membrane is preferably coated from top to bottom or from bottom to top, coating from top to bottom being preferred. The method according to the present invention makes it possible to achieve coated hollow fiber composite membranes having advantageous characteristics as set out below.

The self-supporting hollow fiber composite membranes having an isoporous inner skin and an outer porous support membrane according to the present invention have preferably an inner skin of at least one amphiphilic block copolymer and outer porous support membrane is preferably a polymer material selected from the group consisting of a cellulose acetate (CA) membrane, a polyethersulfone (PES) membrane, a polyetherimide (PEI) membrane, a polyvinylidene fluoride (PVDF) membrane, a polysulfone (PSf) membrane, a polyacrylonitrile (PAN) membrane, a polyamide-imide (PAI) membrane, a modified cellulose acetate (mCA) membrane, a modified polyethersulfone (mPES) membrane, a modified polyetherimide (mPEI) membrane, a modified polyvinylidene fluoride (mPVDF) membrane, a modified polysulfone (mPSf) membrane, a modified polyacrylonitrile (mPAN) membrane, a modified polyamide-imide (mPAI) membrane, etc.; a ceramic membrane, and a metallic membrane. The pore size of the inner skin is smaller than the pore size of the outer porous support membrane. The isopores of the separation-active inner skin preferably have a ratio of the maximum pore diameter to the minimum pore diameter (pore size dispersity) of less than 10, more preferably less than 5, most preferably less than 3; and preferably a median pore size ranging from 1 nm to 70 nm, preferably from 2 nm to 40 nm, more preferably from 10 to 30 nm.

In order to remove the solvent or solvents completely, the membranes may be kept in water for 1 to 2 days and washed prior to use.

The coated hollow fiber composite membrane according to the present invention may have a flux from 1000 to 30,000 $dm^3/(m^2 \cdot h \cdot MPa)$, such as 3000 to 20000 $dm^3/(m^2 \cdot h \cdot MPa)$. At this flux, the coated hollow fiber membrane according to the present invention still maintains high selectivity.

The proposed method of the coating can be also applied to prepare isoporous surfaces in multibore membranes and the lumens having different architected shapes such as triangular-polygon or star-shaped in order to increase surface area for separation. The process holds the potential to coat a bundle of hollow fiber support membranes together. Also, two opposite electrolytes can be added to support membrane and in the coating solution in order to produce an electro-conductive isoporous composite hollow fiber membrane.

Membranes having isoporous surfaces on both sides could be beneficial for instance for applications in bioprocessing. For this, the outer surface of inside-out isoporous composite hollow fibers can also be coated which will result in a membrane having isoporous inner and outer surfaces. The coating of the outer surface could be performed by the methods described in the article by Y. Liu et al. "*Fabrication of a Novel PS4VP/PVDF Dual-layer Hollow Fiber Ultrafiltration Membrane*", Journal of Membrane Science 506, 1-10, 2016.

Further methods for producing a coating on outer surface are disclosed in: Y. Zhang et al. "*Nanomanufacturing of High-performance Hollow Fiber Nanofiltration Membranes by Coating Uniform Block Polymer Films from Solution*", Journal of Materials Chemistry A 5, 3358-3370, 2017 and Y Zhang et al. "*Block Polymer Membranes Functionalized with Nanoconfined Polyelectrolyte Brushes Achieve Sub-Nanometer Selectivity*", ACS Macro Letters 6, 726-732, 2017.

Furthermore, the present invention provides a filtration module, in particular a microfiltration module, an ultrafiltration module, or a nanofiltration module, comprising at least one of the hollow fiber polymer membranes according to the present invention. The coated hollow fiber membranes according to the present invention are e.g. useful for pre-treatment of process water or ultrapure water, reuse, sewage and wastewater treatment and water purification.

If electrically conductive membranes are desired, the membranes can be produced having different charges in the support membrane and coating membrane.

Further characteristics of the invention will become apparent from the description of embodiments according to the invention together with the claims and the included drawings.

DETAILED EXPLANATION OF PREFERRED EMBODIMENTS WITH REFERENCE TO THE FIGURES

The invention is now described below in an exemplary manner, without restricting the general intent of the invention, based on exemplary embodiments with reference to the figures appended hereto, wherein.

Figure 1:
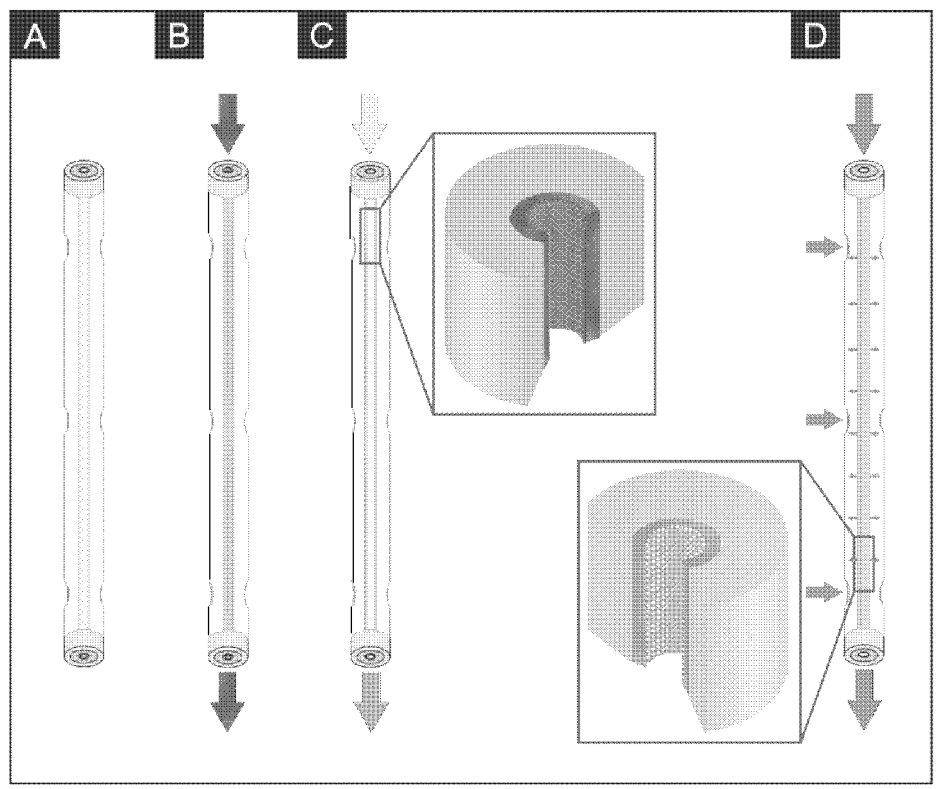
FIG. 1 is a schematic diagram of the method according to the present invention, wherein the hollow fiber support membrane is preferably coated from top to bottom.
Figure 2:
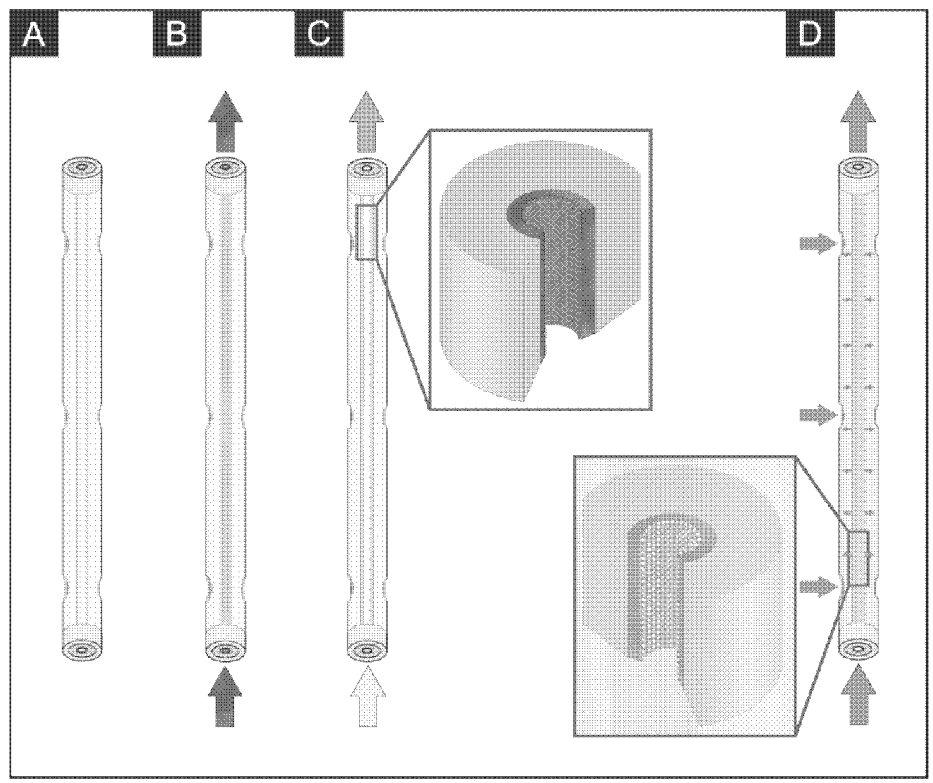
FIG. 2 is a schematic diagram of the method according to the present invention, wherein the hollow fiber support membrane is preferably coated from bottom to top.
Figure 3A:
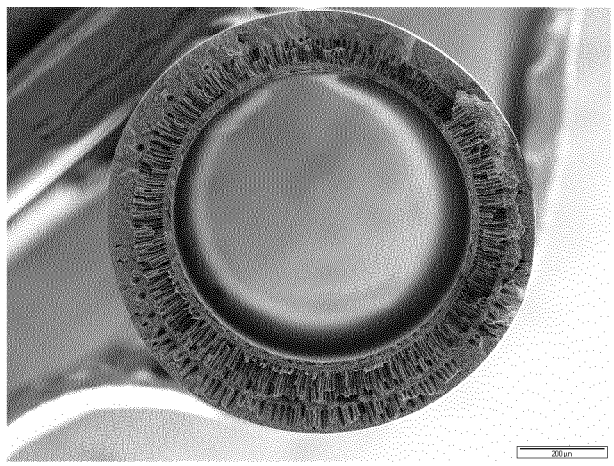
FIG. 3a shows an SEM of the cross-section of a PEI support membrane coated top-bottom with 1.5 wt % $PS_{79}$-b-$P4VP_{21}^{70k}$ in dioxane: $Q_{dox}$=0.2 mL/min; $Q_p$=0.2 mL/min; $Q_{CO2}$=0.2 mL/min; $Q_w$=0.5 mL/min; $T_{dox}$=10 s; $T_p$=15 s; $T_{CO2}$=15 s.
Figure 3B:
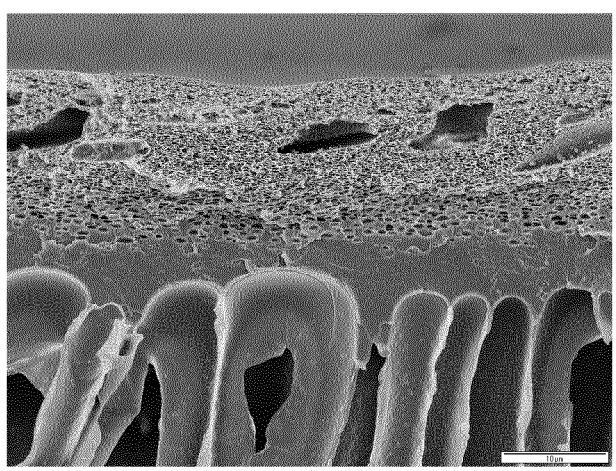
FIG. 3b shows the cross-section near the inner surface of the coated membrane of FIG. 3a. The coating thickness is about 13 µm.
Figure 3C:
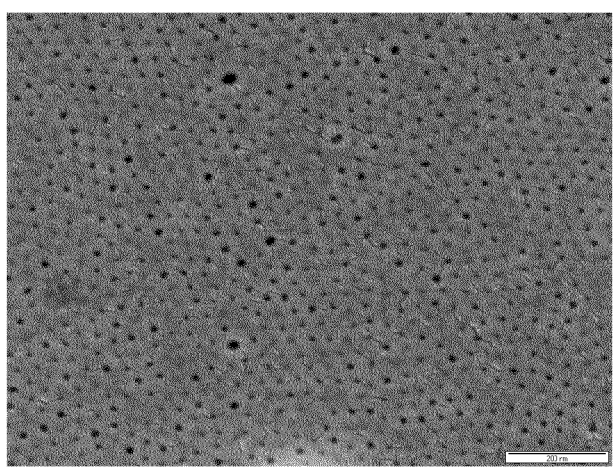
FIG. 3c shows the morphology of the inner surface of the coated membrane of FIG. 3a in top view.
Figure 4A:
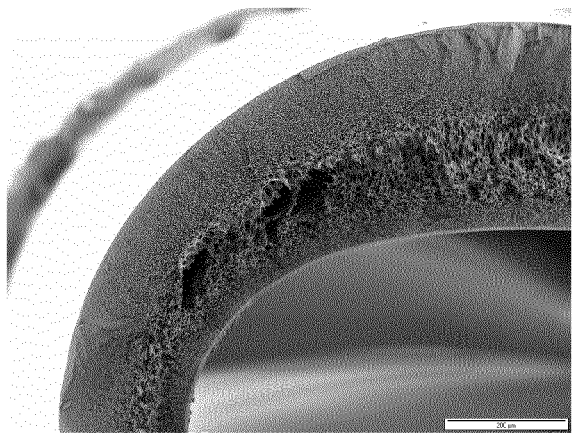
FIG. 4a shows an SEM of the cross-section of a PES support membrane coated top-bottom with 1.5 wt % $PS_{79}$-b-$P4VP_{21}^{70k}$ in dioxane: $Q_{dox}$=1.0 mL/min; $Q_p$=1.0 mL/min; $Q_{CO2}$=1.0 mL/min; $Q_w$=1.0 mL/min; $T_{dox}$=15 s; $T_p$=25 s; $T_{CO2}$=15 s.
Figure 4B:
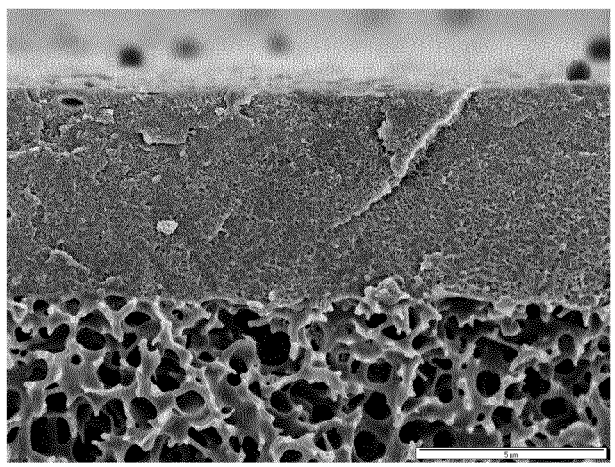
FIG. 4b shows the cross-section near the inner surface of the coated membrane of FIG. 4a. The coating thickness is about 5 µm.
Figure 4C:
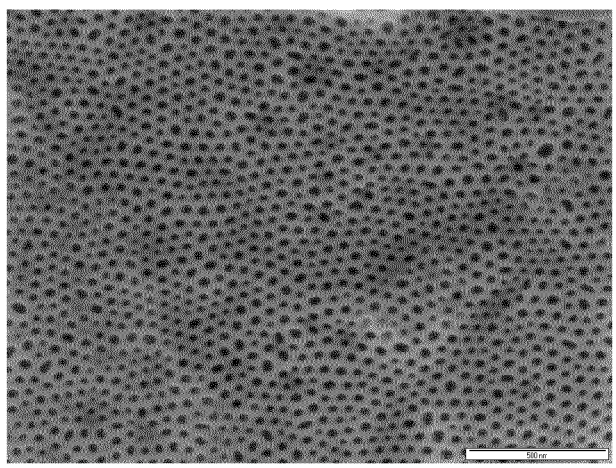
FIG. 4c shows the morphology of the inner surface of the coated membrane of FIG. 4a in top view.
Figure 5A:
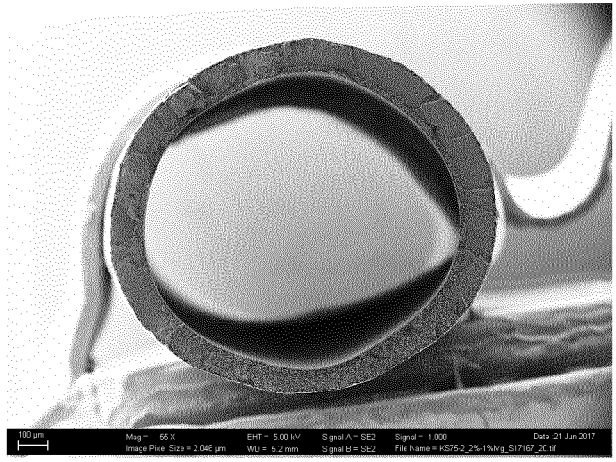
FIG. 5a shows an SEM of the cross-section of a mPES support membrane (commercially available) coated top-bottom with 2 wt % $PS_{79}$-b-$P4VP_{21}^{70k}$ and 1 wt % MgAc in dioxane: $Q_p$=1.0 mL/min; $Q_{N2}$=0.5 mL/min; $Q_w$=0.5 mL/min; $T_p$=5 s; $T_{N2}$=5 s.
Figure 5B:
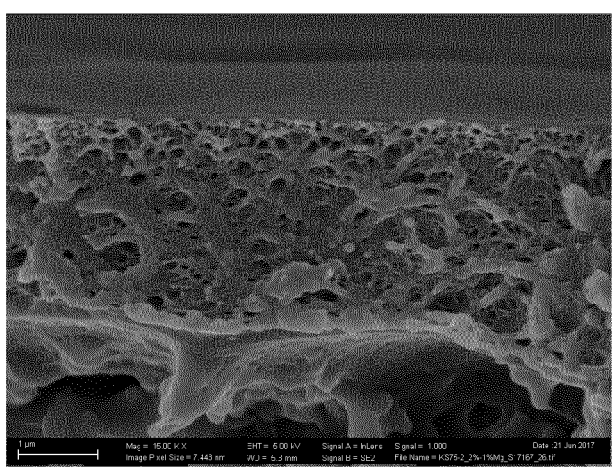
FIG. 5b shows the cross-section near the inner surface of the coated membrane of FIG. 5a. The coating thickness is about 3 µm.
Figure 5C:
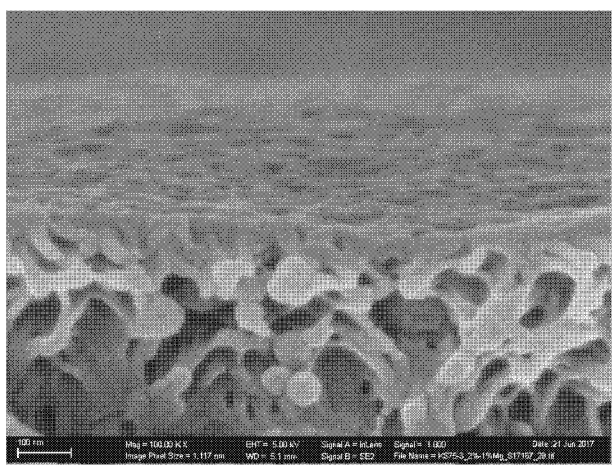
FIG. 5c shows the morphology of the inner surface of the coated membrane of FIG. 5a in cross-sectional view.
Figure 5D:
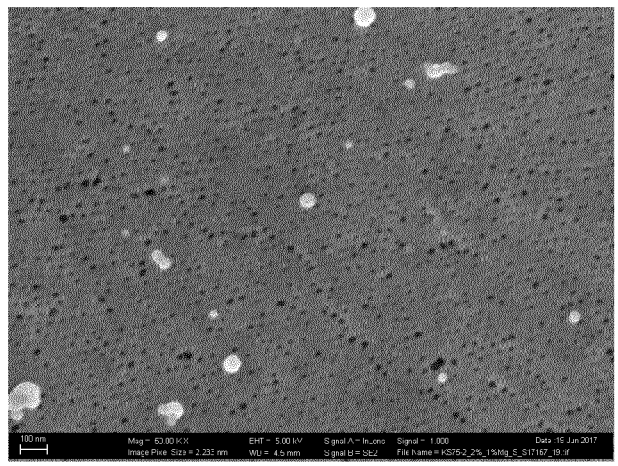
FIG. 5d shows the morphology of the inner surface of the coated membrane of FIG. 5a in top view.
Figure 6A:
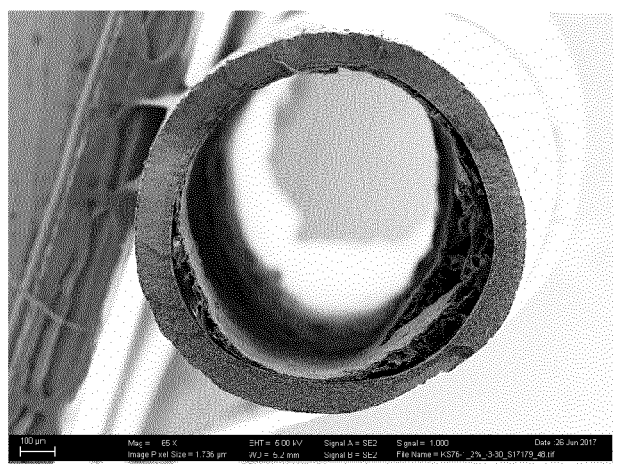
FIG. 6a shows an SEM of the cross-section of a mPES (commercially available) support membrane coated bottom-top with 2 wt % $PS_{82.7}$-b-$P4VP_{17.3}^{168k}$ and 1 wt % MgAc in dioxane: $Q_p$=1.0 mL/min; $Q_{N2}$=0.5 mL/min; $Q_w$=0.5 mL/min; $T_p$=10 s; $T_{N2}$=20 s.
Figure 6B:
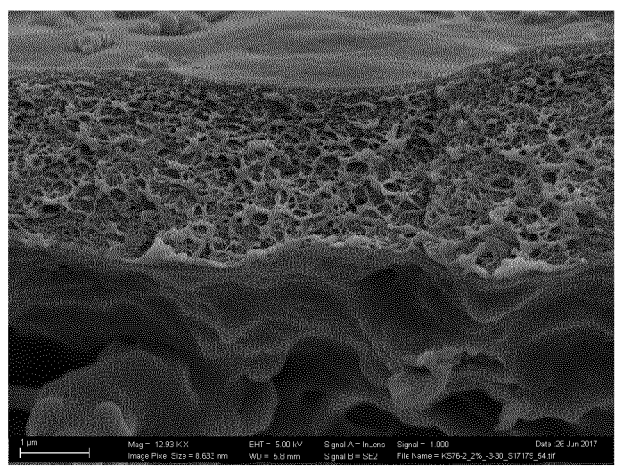
FIG. 6b shows the cross-section near the inner surface of the coated membrane of FIG. 6a. The coating thickness is about 3 µm.
Figure 6C:
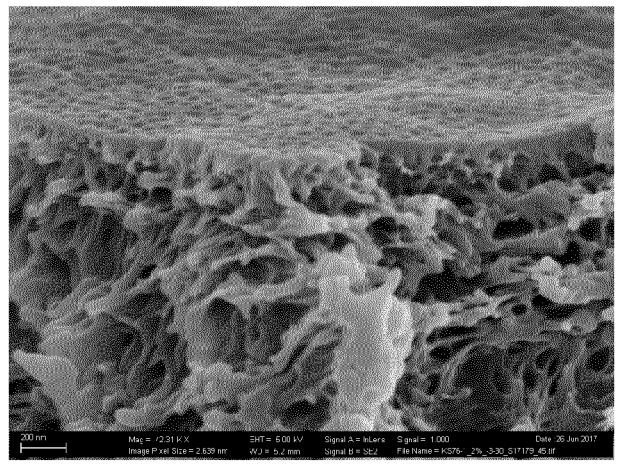
FIG. 6c shows the morphology of the inner surface of the coated membrane of FIG. 6a in cross-sectional view.
Figure 6D:
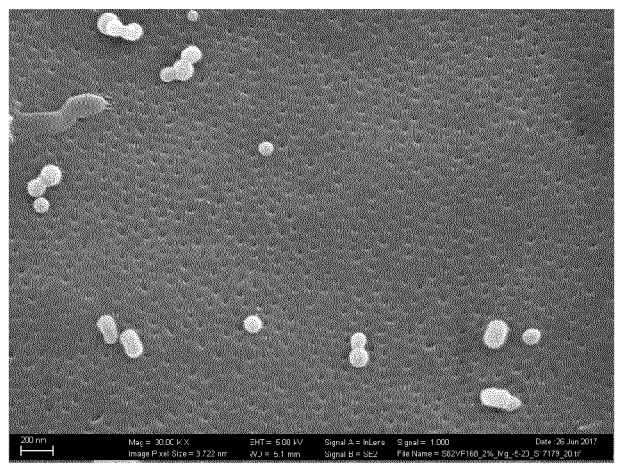
FIG. 6d shows the morphology of the inner surface of the coated membrane of FIG. 6a in top view.

With reference to FIGS. 1 and 2, there is shown a schematic diagram of the method according to the present invention, wherein in step A a hollow fiber support membrane having a lumen surrounded by the support membrane is provided.

Prior to coating, a module which consists of transparent PVC U-tubes having an outer diameter of about 6 mm and thickness of about 1 mm were provided in the present case. The tubes were preferentially pierced at every 3 cm distance, using a bore of 2.4 mm in order to fasten the exchange of solvent/non-solvent, to lead away the water filtered through the coated membrane and to avoid floating of the modules in the precipitation bath. To hold and straighten the support fibers both ends of PVC modules were sealed using epoxy resin. The effective length was varied in the range of 10-20 cm and a typical preparation procedure started with modules having one support membrane. A larger module can contain bundle of longer fibers as well.

The hollow fiber support membrane may thereafter be pretreated with a non-solvent for support membrane and which shows good miscibility with the block copolymer solution, such as dioxane or dioxane/acetone.

In steps B, C and D, three fluids were pumped from top to bottom (FIG. 1) or bottom to top (FIG. 2), respectively, as indicated by the arrows, for a certain time period through the module to achieve isoporous surface on the inner side: in step B the polymer solution as coating material; in step C a core gas for removal of superfluous polymer solutions and for providing sufficient evaporation time for self-assembly; in step D a non-solvent, such as water, for precipitation of the coated layer. Fibers with newly developed thin selective layer were then washed and kept in DI water. In step C, nitrogen ($N_2$) and carbon dioxide ($CO_2$) were used as gaseous fluid. To control the flow rates high-precision syringe pumps were used. The type of polymer solutions, flow rates and purge times are indicated in the description of FIGS. 3a, 4a, 5a, and 6a, respectively. Further, the fluids can be either pumped through or sucked out for coating, depending on the requirements and availability of the system.

The morphology of the membranes was investigated using scanning electron microscopy (SEM). Specimens for the SEM of cross-section measurements were prepared by freezing the membrane samples in liquid nitrogen. The membrane surfaces and cross-sectional pieces were coated with a 2 nm thin platinum layer.

Following abbreviations were used to define the coating parameters:

Dioxane pretreatment flow rate ($Q_{dox}$); polymer solution flow rate ($Q_p$); nitrogen ($N_2$) flow rate ($Q_{N2}$) or carbon dioxide ($CO_2$) flow rate ($Q_{CO2}$); water flow rate ($Q_w$); time of dioxane pretreatment ($T_{dox}$); time of flow for polymer solution ($T_p$); time of flow for $N_2$ ($T_{N2}$); time of flow for water ($T_w$.

Additives: Magnesium acetate (MgAc) or α-cyclodextrin

Polymer characteristics (where subscripts denote the amount of respective block in wt. % and the digits in brackets show the number average molar mass in kg/mol):
1. $PS_{86.5}$-b-$P4VP_{13.5}$ (82.8 kg/mol)
2. $PS_{79}$-b-$P4VP_{21}$ (70 kg/mol)
3. $PS_{82.7}$-b-$P4VP_{17.3}$ (168 kg/mol)
4. $PS_{83}$-b-$P4VP_{17}$ (139 kg/mol)

Used Support Membranes:
1. Polyetherimide (PEI) membranes
2. Polyethersulfone (PES) membranes
3. Modified PES (mPES) membranes (commercial).

FIGS. 3a to 6d show the results of four samples prepared using the method according to the present invention. FIGS. 3a to 5d display results of the coating experiments performed in top-bottom direction on three different support hollow fiber membranes: PEI, PES and mPES, while FIGS. 6a to 6d show the results of the coating performed in bottom-top direction on mPES support. The cross-section images highlight uniform coating of thicknesses ranging from 3 to 15 μm (see description of Figures). Inner surface morphology shows that the method provides inside-out isoporous composite hollow fiber membranes. The porosity on inner surface can be increased by e.g. increasing the amount of additives, and variation in coating parameters e.g., flow rate and time of flow for gas stream.

The invention claimed is:

1. A method for producing a coated hollow fiber membrane having an isoporous inner skin, comprising providing a hollow fiber support membrane having a lumen surrounded by the support membrane, and coating and the inner surface thereof by first passing a polymer solution of at least one amphiphilic block copolymer in a suitable solvent through the lumen of the hollow fiber support membrane and along the inner surface thereof, thereafter pressing a core gas stream through the lumen of the coated hollow fiber membrane to remove superfluous polymer solution and to provide sufficient evaporation time for self-assembly, and thereafter passing a non-solvent through the lumen of the coated hollow fiber membrane.

2. The method according to claim 1, wherein the hollow fiber support membrane having a lumen surrounded by the support membrane support membrane is polymeric material, selected from the group consisting of a cellulose acetate (CA) membrane, a polyethersulfone (PES) membrane, a polyetherimide (PEI) membrane, a polyvinylidene fluoride (PVDF) membrane, a polysulfone (PSf) membrane, a polyacrylonitrile (PAN) membrane, a polyamide-imide (PAI) membrane, a modified cellulose acetate (mCA) membrane, a modified polyethersulfone (mPES) membrane, a modified polyetherimide (mPEI) membrane, a modified polyvinylidene fluoride (mPVDF) membrane, a modified polysulfone (mPSf) membrane, a modified polyacrylonitrile (mPAN) membrane, a modified polyamide-imide (mPAI) membrane etc.; a ceramic membrane and a metallic membrane.

3. A self-supporting, coated hollow fiber composite membrane produced according to the method of claim 2.

4. A filtration module comprising at least one coated hollow fiber membranes having an isoporous inner skin prepared according to the method of claim 1.

5. A self-supporting, coated hollow fiber membrane produced according to the method of claim 2, which is electro-conductive.

6. A filtration module comprising at least one coated hollow fiber membranes having an isoporous inner skin prepared according to the method of claim 1.

7. The method according to claim 1, wherein the hollow fiber support membrane has an inner diameter ranging from 0.2 to 3.0 mm.

8. The method according to claim 1, wherein the hollow fiber support membrane has a length of from 5 cm to 80 cm.

9. The method according to claim 1, wherein the at least one amphiphilic block copolymer used for making the isoporous inner skin is a polystyrene-block-poly(4-vinylpyridine) (PS-b-P4VP) block copolymer.

10. The method according to claim 1, wherein the polymer solution further comprises at least one metal salt or a carbohydrate, wherein the metal salt is an organic salt of Mg, Ca or Sr.

11. The method according to claim 1, wherein the core gas is selected from compressed air, nitrogen, a noble gas and/or carbon dioxide (CO2), whereby the core gas is pressed or sucked through the lumen of the support membrane with a flow rate between 0.1 mL/min and 5 ml/min.

12. The method according to claim 1, wherein the non-solvent comprises water, methanol, ethanol or a mixture of two or more thereof, and wherein the non-solvent is pressed or sucked through the lumen of the support membrane with a flow rate between 0.1 mL/min and 5 mL/min.

13. The method according to claim 1, further comprising the step of washing the fiber in a non-solvent such as water.

14. The method according to claim 1, wherein, prior to coating the hollow fiber support membrane is pre-treated by passing a non-solvent for support membrane through the lumen thereof, wherein the non-solvent comprises dioxane.

15. The method according to claim 1, wherein the lumen surrounded by the support membrane support membrane has a multi bore, triangular-polygon or star-shaped lumen architecture.

* * * * *